United States Patent [19]  
Saito

[11] Patent Number: 4,786,544  
[45] Date of Patent: Nov. 22, 1988

[54] MAGNETIC RECORDING MEDIUM
[75] Inventor: Osamu Saito, Takatsuki, Japan
[73] Assignee: Hitachi Maxell, Ltd., Osaka, Japan
[21] Appl. No.: 35,920
[22] Filed: Apr. 8, 1987
[30] Foreign Application Priority Data Apr. 8, 1986 [JP] Japan ............................. 61-80699

[51] Int. Cl.⁴ .......................................... G11B 5/71
[52] U.S. Cl. .................................. 428/143; 427/128; 427/131; 428/141; 428/148; 428/149; 428/421; 428/422; 428/694; 428/695; 428/900; 428/447; 428/522
[58] Field of Search ............... 427/131, 132; 428/695, 428/694, 141, 143, 148, 149, 900, 421, 422, 323, 704, 447, 522

[56] References Cited
U.S. PATENT DOCUMENTS 3,993,824 11/1976 Shirahata ........................ 428/900
4,188,434  2/1980 Loran ............................. 427/128
4,268,556  5/1981 Pedrotty .
4,368,239  1/1983 Nakajima ........................ 428/695
4,404,247  9/1983 Dominguez-Burguette ....... 428/420
4,499,138  2/1985 Yamamoto ..................... 428/695
4,645,703  2/1987 Suzuki ........................... 427/131
4,677,023  6/1987 Ishizaki ......................... 428/900
4,692,378  9/1987 Ishihara ........................ 428/900

FOREIGN PATENT DOCUMENTS 0124708 9/1979 Japan ........................... 428/695
0151841 8/1985 Japan ........................... 428/900

Primary Examiner—Ellis P. Robinson  
Attorney, Agent, or Firm—Birch, Stewart, Kolasch & Birch

[57] ABSTRACT

A magnetic recording medium comprising a substrate, a magnetic layer formed on at least one surface of the substrate and a lubricant layer comprising at least two components substantially incompatible with each other, coated on the surface of the magnetic layer, forming a like structure, which has improved abrasion resistance, durability and running stability.

7 Claims, 1 Drawing Sheet

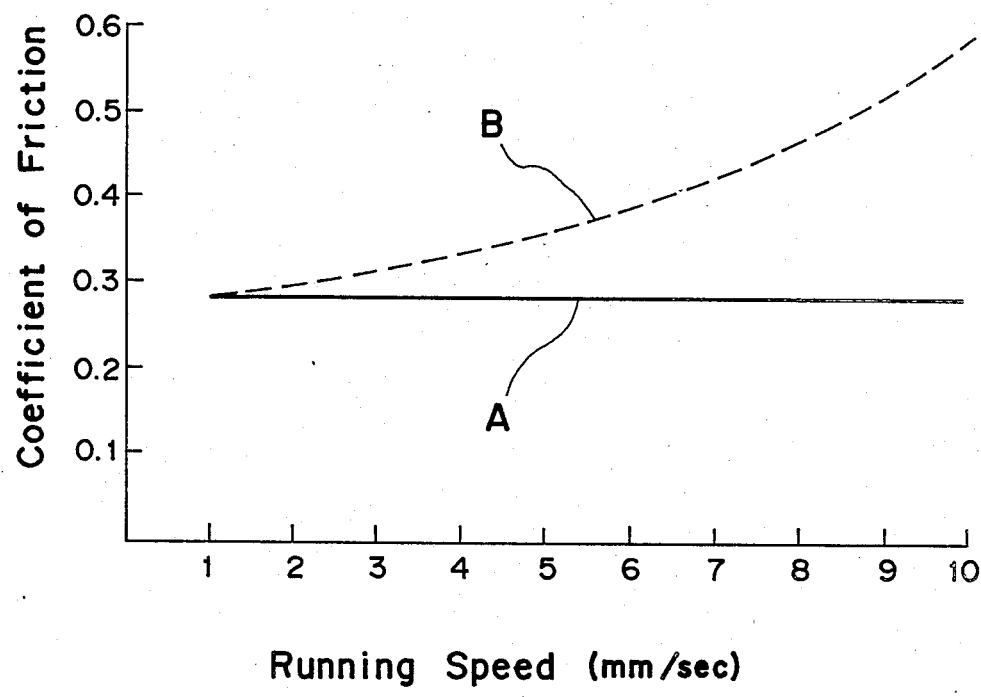
Figure

MAGNETIC RECORDING MEDIUM

BACKGROUND OF THE INVENTION

1. Field of the Invention

The present invention relates to a magnetic recording medium such as a magnetic tape, a magnetic disc and a magnetic card. More particularly, it relates to a magnetic recording medium comprising a lubricant on a surface of a magnetic layer.

2. Description of the Prior Art

A magnetic recording medium comprising a substrate and a magnetic layer which is formed on the substrate and consists of a thin film of a metal or a metal oxide with high coercive force has an extremely smooth surface and a large coefficient of friction, so that it is easily abraded or damaged when it contacts a magnetic head and/or a guide during recording or reproducing. To prevent abrasion and damage of such a magnetic layer, it has been proposed to coat the surface of the magnetic layer with a lubricating layer comprising higher fatty acids or their metal salts, and macromolecular compounds such as organic silicon compounds, whereby the coefficient of the surface of the magnetic layer is reduced so as to improve abrasion resistance, durability and running stability of the magnetic recording medium.

For a magnetic recording medium comprising a magnetic coating layer formed by applying a magnetic paint and drying it, improvement of abrasion resistance of the magnetic layer is increasingly required with the increase of surface smoothness of the magnetic layer which is desired for better electromagnetic conversion characteristics. To this end, it has been proposed to coat the surface of the magnetic layer with various lubricants to form a protective film with good lubrication, or to add the lubricant to the magnetic coating layer so as to exude it on to the surface of the magnetic layer.

When the surfaces of the magnetic layer and of the magnetic head or the tape guide are extremely smooth, under a circumstance when the magnetic recording medium contacts the magnetic head at a high speed, the lubricant cannot exert sufficient lubrication effect and viscosity resistance of the lubricant increases so that the running stability of the medium deteriorates and, in turn, fluctuation of the output is increased. Furthermore, the magnetic recording medium sticks to the tape guide and running of the medium is stopped.

SUMMARY OF THE INVENTION

One object of the present invention is to provide a magnetic recording medium with improved abrasion resistance, durability and running stability.

Another object of the present invention is to provide a magnetic recording medium having a magnetic layer on which a lubricating layer with a specific construction is formed.

These and other objects of the present invention are achieved by a magnetic recording medium comprising a substrate, a magnetic layer formed on at least one surface of the substrate and a lubricant layer comprising at least two components which are not compatible enough to form a uniform mixture with each other and coated on the surface of the magnetic layer to form a like structure.

BRIEF DESCRIPTION OF THE DRAWING

FIGURE is a graph showing a relationship between the running speed of the magnetic tape and the coefficient of friction of the magnetic layer in Example 1 and Comparative Example 1.

DETAILED DESCRIPTION OF THE INVENTION

When at least two lubricants which are substantially incompatible with each other are coated on the surface of the magnetic layer, they do not mix together and in effect form a dispersion with the two lubricants separated from each other in a microphase. Then, one of the lubricants having a better affinity for the magnetic layer due to its properties and molecular structure than the others, forms a continuous film ("sea" portion) on the surface of the magnetic layer, and the other lubricant(s) having less affinity with the surface of the magnetic layer forms discontinuous "islands" in the "sea" portion and thereby the sea-island structure of the lubricants is formed on the surface of the magnetic layer.

When the sea-island structure of the lubricants is destroyed by high speed sliding of the magnetic layer on the magnetic head or the guide, a new sea-island structure is successively formed by microphase separation of the lubricants. Therefore, the lubricant layer can maintain a stable performance, and viscosity resistance of the lubricants does not increase under high speed sliding conditions. In addition, since the lubricant layer with the sea-island structure has a good durability or permanence, it has much better lubricating effect than the lubricant which forms just the "sea" portion alone. By this effect, together with the suppression of the viscosity resistance, the magnetic recording medium according to the present invention has better running stability and less fluctuation of output, and sticking to the guide is prevented.

One of the preferred combinations of the lubricants is a combination of a liquid lubricant and a solid lubricant, in which the former forms the "sea" and the latter forms the "islands".

The liquid lubricant may be any one of a number of lubricants which are in a liquid state at room temperature. In view of good affinity with the surface of the magnetic layer and their lubricating properties, fluorine-containing compounds, organic silicone compounds and fatty acid esters are preferred.

The solid lubricant may be any one of a number of lubricants which are in a solid or semisolid state at room temperature and incompatible with the liquid lubricant. In view of the lubricating effect, higher fatty acid, higher fatty acid esters and fluorine-containing compounds are preferred.

Particularly preferred examples of the fluorine-containing compounds as the liquid lubricants include a compound of the formula:

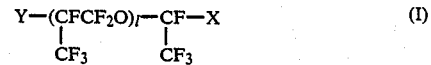
(I)

or
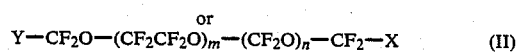
(II)

wherein X and Y are the same or different and each a fluorine atom, a hydrophilic group or a monovalent group having a terminal carbon-carbon double bond, 1 is an integer of 10 to 100, m is an integer of 5 to 100 and n is an integer of 10 to 200. When at least one of X and Y is the hydrophilic group of the monovalent group, it can impart affinity with the surface of the magnetic layer to the compound and contributes to the formation of the "sea" portion of the lubricant.

Specific examples of the hydrophilic group are a hydroxyl group, a carboxyl group, a phosphoric acid group [—OP(=O)(OH)$_2$], a sulfonic acid group [—OS(=O)$_2$OH], an isocyanate group, salt forms of these groups, or an organic group containing one of these groups and their salt forms. Preferred examples of the salt are salts with alkali metals such as sodium and potassium, although salts with alkaline earth metals, iron, cobalt, nickel, chromium and the like may be used. Specific examples of the organic group containing one of the above groups and their salts are a group of the formula:

     (i)

or

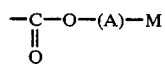     (ii)

wherein A is an alkylene group having not more than 40 carbon atoms, an alkyleneoxide group having 2 to 4 carbon atoms or a polyalkylene oxide having not more than 80 carbon atoms in total, and M is a hydroxyl group, a carboxylic group, a phosphoric acid group, a sulfonic acid group, an isocyanate group or their salts, or a group of the formula:

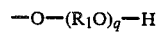     (iii)

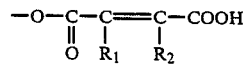     (iv)

or

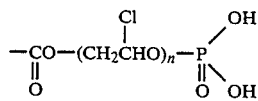     (v)

wherein $R_1$ is an alkylene group having 1 to 4 carbon atoms, one of $R_2$ and $R_3$ is a hydrogen atom and the other is a methyl group or both are hydrogen atoms, q is an integer of 1 to 20, and n is an integer of 1 to 20.

Preferred examples of the organic group having the terminal carbon-carbon double bond are a (meth)acryloyloxy group of the formula:

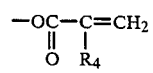     (vi)

wherein $R_4$ is a hydrogen atom or a methyl group, or an alkylene group having the group (vi).

Other fluorine-containing liquid compounds may be used as liquid lubricants insofar as they have the same properties as the fluorine-containing compounds (I) and (II). For example, a compound (II) wherein X or Y is a hydrophilic group such as —C(=O)OR$_5$ in which R$_5$ is an alkyl group or an organic group not having a carbon-carbon double bond, or a fluorine-containing compound disclosed in German Pat. No. 2,839,378 can be used.

Examples of the organic silicone compound as the liquid lubricant are polysiloxanes such as dimethylpolysiloxane and methylphenylpolysiloxane, and silicone compound having the hydrophilic group as explained in connection with the fluorine-containing lubricant.

Examples of the fatty acid esters as the liquid lubricant are dioleyl maleate, trimethylolpropane tridecanoate, 2-ethylhexyl stearate and the like.

Examples of the higher fatty acid as the solid lubricant are fatty acids having at least 12 carbon atoms such as stearic acid. Examples of the ester of the higher fatty acid are a monoalkyl ester or cellosolve of a higher fatty acid having at least 16 carbon atoms, or a phosphate of a higher fatty alcohol having the same number of carbon atoms. As the fluorine-containing compound, used are not only a conventional solid fluorine-containing compound but also a fluorine-containing compound having an alkylene group, an alkyleneoxide group or a polyalkyleneoxide group in the molecule or a fluorine-containing compound having the same hydrophilic group as contained in the liquid lubricant.

According to the present invention, at least one liquid lubricant and at least one solid lubricant which are substantially incompatible with each other are selected from the above described liquid and solid lubricants. When two or more liquid lubricants or two or more solid lubricants are used, they also will meet the compatibility requirements set forth above. Essential is that the liquid lubricant and the solid lubricant be incompatible so as to form a dispersion of the solid lubricant in the liquid lubricant such that the former floats at the surface of the latter.

In the combination of the liquid lubricant and the solid lubricant, the former forming the "sea" portion is used in an amount of 5 to 99.9% by weight, preferably 20 to 99.5% by weight based on the total weight of the all lubricants, while the latter forming the "islands" in the "sea" is used in an amount of 95 to 0.1% by weight, preferably 80 to 0.5% by weight based on the total weight of the all lubricants.

The magnetic recording medium of the present invention may be either of one comprising a non-mangetic substrate and a magnetic layer made of a thin layer of ferromagnetic metal or alloy and one comprising a non-magnetic substrate and a magnetic layer made from a magnetic paint containing magnetic powder. The present invention is particularly useful for the former.

The ferromagnetic metal or metal oxide may be any conventional material and includes iron, cobalt, nickel, chromium and their alloys, and alloys of these metals with other metal elements or non-metal elements as well as their oxides.

The magnetic layer comprising the ferromagnetic metal or metal oxide is formed by a per se conventional method. For example, on a non-magnetic substrate such as a polyester film, a thin layer of the ferromagnetic metal or metal alloy is formed by vacuum deposition, ion plating, sputtering, plating and the like. The thickness of the ferromagnetic metal or metal oxide thin layer is from 0.005 to 0.5 μm.

The magnetic layer comprising the ferromagnetic metal or metal oxide may be provided with a coating film on its surface to protect its surface. The protective layer includes an oxide layer formed by oxidizing the surface of the magnetic layer, a layer consisting of a hard metal such as titanium and bismuth or their oxides, a thin layer of an organic or inorganic compound formed by vacuum deposition, sputtering or plasma polymerization. The protective layer may be a single layer or a laminated layer of these layers.

When the magnetic layer comprises the magnetic coating film, examples of the magnetic powder are metal oxide powder (e.g. $\gamma$-$Fe_2O_3$, $Fe_3O_4$, an intermediate oxide of these two iron oxides, Co-containing $\gamma$-$Fe_2O_3$, Co-containing $Fe_3O_4$, $CrO_2$ and barium, strontium or lead ferrite), and magnetic metal powder (e.g. iron, cobalt, nickel, their alloys, alloys of these metals with other metal or a small amount of non-metal element).

Specific examples of the binder resin are vinyl chloride-vinyl acetate copolymers, cellulose type resins, polyurethane, polyester resins, polyvinylbutyral, epoxy resins, polyols, and as a cross linking agent, a polyisocyanate compound.

The magnetic layer comprising the magnetic coating film can be formed by a per se conventional method. For example, a magnetic coating composition is prepared by mixing the magnetic powder, the binder and optionally at least one additive and coated on the non-magnetic substrate such as the polyester film followed by drying. The thickness of the magnetic coating film is preferably from 0.1 to 20 $\mu$m. As the optional additive exemplified are abrasives, dispersion agents and antistatic agents.

Various methods can be employed to apply the lubricant mixture of the liquid lubricant and the solid lubricant to the surface of the magnetic layer.

For example, when the liquid lubricant is the fluorine-containing compound (I) or (II) or the organic silicone compound and solid lubricant is the fluorine-containing solid compound, they are dissolved in a fluorine-containing solvent (e.g. trichlorotrifluoroethylene, tetrachlorodifluoroethane, etc.), ketone (e.g. methyl ethyl ketone, methyl isobutyl ketone, etc.) or ester (e.g. ethyl acetate, butyl acetate, etc.) or a mixture thereof. Then the solution containing the lubricants is coated or spray coated on the surface of the magnetic layer. Alternately, the magnetic recording medium is dipped in the solution. Thereafter, the magnetic recording medium coated with the lubricant solution is dried to form the lubricant layer having the sea-island structure.

Alternatively, the lubricant mixture may be contained in or form a back coating on the back surface of the magnetic recording medium. Then, a plurality of magnetic mediums are piled up, or the magnetic tape is wound. Thus, the magnetic layer is contacted with the back coating containing or comprising the lubricants so that the lubricants are transferred to the surface of the magnetic layer to form the lubricant layer having the sea-island structure.

When the magnetic recording medium is a magnetic disc and installed in a jacket, the lubricants can be contained in a liner which is made of non-woven fabric. Then, the lubricants are transferred from the jacket to the surface of the magnetic layer to form the lubricant layer with the sea-island structure.

The amount of the lubricants is usually from 0.5 to 200 mg/$m^2$. When the amount of the lubricant is too large, interlayer sticking may occur, this resulting in deterioration of the running stability, or the surface condition may be worsen and in turn the electromagnetic conversion characteristics may deteriorate.

For simply forming the lubricant layer having the sea-island structure according to the present invention when the magnetic layer is formed by the application of the magnetic paint followed by drying, the lubricants are added to the magnetic paint. When the lubricants are contained in the magnetic layer, they gradually exude onto the surface of the magnetic layer to form the lubricant layer having the sea-island structure. In this manner, the lubricants are added to the magnetic paint in a total amount of 0.2 to 20% by weight per 100 parts by weight of the magnetic powder.

The sea-island structure of the lubricant layer is easily observed by a microscope and can be distinguished from a lubricant layer consisting of the lubricant which forms the sea portion.

In the above description, the liquid lubricant forms the "sea" portion and the solid lubricant forms the "islands". On the contrary, when the solid lubricant has better affinity with the surface of the magnetic layer than the liquid lubricant, the former forms the "sea" portion and the latter forms the "islands".

In a further embodiment of the present invention, the lubricant layer having the sea-island structure may be formed by at least two liquid lubricants or at least two solid lubricants having different affinity with the surface of the magnetic layer. When one of the lubricants has a much better affinity with the surface of the magnetic layer than other lubricant(s), it can form the "sea" portion by microphase separation.

PREFERRED EMBODIMENTS

The present invention will be illustrated by following examples, in which "parts" are by weight unless otherwise indicated.

EXAMPLE 1

A non-magnetic substrate made of a polyester film of 11 $\mu$m in thickness was subjected to bombarding in an argon atmosphere to treat its surface by a conventional method and set in a vacuum deposition apparatus. Then, cobalt was vacuum deposited on the surface of the substrate under reduced pressure of $5 \times 10^{-4}$ Torr to form a layer of cobalt of 0.1 $\mu$m in thickness.

Then, on the surface of the cobalt layer, a lubricant solution of the compound (I) wherein Y is fluorine, X is —$C_2H_4OH$ and l is 30 (7 parts) as a liquid lubricant and stearyl alcohol phosphate (3 parts) as a solid lubricant in trichlorotrifluoroethane (190 parts) was coated so that, after drying, non-volatile components remained in a total amount of 50 mg/$m^2$ followed by drying to form a lubricant layer. Then, the substrate film with the cobalt layer and the lubricant layer was cut to produce a magnetic tape having a width of 12.5 mm.

EXAMPLE 2

In the same manner as in Example 1 but using the compound (I) wherein Y is fluorine, X is carboxyl and l is 70 (7 parts) as a liquid lubricant and dodecyl palmitate (3 parts) as a solid lubricant, a magnetic tape was produced.

EXAMPLE 3

In the same manner as in Example 1 but using the compound (II) wherein X and Y are —$C_2H_4OH$ m is 60 and n is 120 (7 parts) as a liquid lubricant and perfluoroalkyl ethanol (3 parts) as a solid lubricant, a magnetic tape was produced.

EXAMPLE 4

In the same manner as in Example 1 but using the compound (II) wherein X is —$CH_2CH_2O$—P(=O)-

(OH)₂, Y is fluorine, m is 60 and n is 120 (7 parts) as a liquid lubricant and perfluorooctanoic acid (3 parts) as a solid lubricant, a magnetic tape was produced.

EXAMPLE 5

In the same manner as in Example 1 but using the compound (II) wherein X and Y are isocyanate, m is 30 and n is 60 (7 parts) as a liquid lubricant and octadecyl stearate (3 parts) as a solid lubricant, a magnetic tape was produced.

EXAMPLE 6

In the same manner as in Example 1 but using the compound (II) wherein X and Y are fluorine, m is 30 and n is 60 (7 parts) as a liquid lubricant and fluorine-containing compound of the formula:

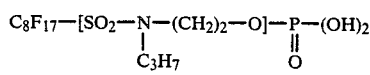

$$C_8F_{17}-[SO_2-N-(CH_2)_2-O]-P-(OH)_2$$
$$\phantom{C_8F_{17}-[SO_2-N}|\phantom{(CH_2)_2-O]-}\|$$
$$\phantom{C_8F_{17}-[SO_2-N}C_3H_7\phantom{(CH_2)_2-O]-}O$$

(3 parts) as a solid lubricant, a magnetic tape was produced.

EXAMPLE 7

In the same manner as in Example 1 but using dimethylpolysiloxane (6 parts) as a liquid lubricant and butylcellosolve stearate (4 parts) as a solid lubricant, a magnetic tape was produced.

EXAMPLE 8

In the same manner as in Example 1 but using methylphenylpolysiloxane (6 parts) as a liquid lubricant and stearic acid (4 parts) as a solid lubricant, a magnetic tape was produced.

EXAMPLE 9

In the same manner as in Example 1 but using trimethylolpropane tridecanoate (6 parts) as a liquid lubricant and a fluorine-containing compound of the formula:

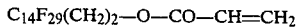

$$C_{14}F_{29}(CH_2)_2-O-CO-CH=CH_2$$

(4 parts) as a solid lubricant, a magnetic tape was produced.

EXAMPLE 10

In the same manner as in Example 1 but using 2-ethylhexyl stearate (6 parts) as a liquid lubricant and a fluorine-containing compound of the formula:

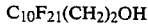

$$C_{10}F_{21}(CH_2)_2OH$$

(4 parts) as a magentic tape was produced.

EXAMPLE 11

In the same manner as in Example 1 but using dioleyl maleate (5 parts) as a liquid lubricant and stearyl alcohol phosphate (4 parts) as a solid lubricant, a magnetic tape was produced.

EXAMPLE 12

On the back surface of the substrate film having the cobalt layer produced in the same manner as in Example 1, coated was a back coating paint containing the fluorine-containing compound (I) wherein Y is fluorine, X is carboxyl and l is 20 (3.5 parts) as a liquid lubricant, perflurophosphate (3.5 parts) as a solid lubricant, a vinyl chloride-vinyl acetate type copolymer having hydroxyl groups (Vinylite VAGH, a trade name of U.C.C., U.S.A.) (50 parts), ZnO powder having an average particle size of 0.2 μm (75 parts), methyl ethyl ketone (650 parts) and n-heptane (300 parts) to form a back coating layer of 2 μm in thickness. Then, the film was cut to produce a magnetic tape having a width of 12.5 mm and wound, whereby the lubricants in the back coating layer were transferred to the cobalt layer on the surface of the tape to form a lubricant layer having the sea-island structure.

EXAMPLE 13

On a non-magnetic substrate made of a polyester film of 12 μm in thickness, coated was a magnetic paint comprising iron powder (average major axis of 0.3 μm, average axis ratio of 10, a specific surface area (by nitrogen adsorption method) of 50 m²/g) (78 parts), carbon black (average particle size of 30 mμ) (5 parts, nitrocellulose (Trade name H1/2 manufactured by Asahi Chemical) (10 parts), polyurethane elastomer (12 parts), methyl ethyl ketone (100 parts) and n-heptane (50 parts) and dried to form a magnetic layer of 4 μm.

Then, on the surface of the magnetic layer, a lubricant solution of the compound (II) wherein X and Y are —C(C=O)OCH₃, m is 60 and n is 120 (7 parts) as a liquid lubricant and myristic acid (7 parts) as a solid lubricant in trichlorotrifluoroethane (186 parts) was coated so that, after drying, non-volatile components remained in a total amount of 70 mg/m² followed by drying to form a lubricant layer. Then, the substrate film with the magnetic layer and the lubricant layer was cut to produce a magnetic tape having a width of 12.5 mm.

COMPARATIVE EXAMPLE 1

In the same manner as in Example 1 but using, as a lubricant solution, a solution of squalane (10 parts) in methyl ethyl ketone (190 parts), a magnetic tape was produced.

COMPARATIVE EXAMPLE 2

In the same manner as in Example 1 but using, as a lubricant solution, a solution of liquid paraffin (10 parts) in methyl ethyl ketone (190 parts), a magnetic tape was produced.

COMPARATIVE EXAMPLE 3

In the same manner as in Example 1 but using, as a lubricant solution, a solution of the fluorine-containing liquid compound (I) wherein X and Y are fluorine and l is 30 (10 parts) in trichlorotrifluoroethane (190 parts), a magnetic tape was produced.

COMPARATIVE EXAMPLE 4

In the same manner as in Example 1 but using, as a lubricant solution, a solution of a fluorine-containing solid compound of the formula: C₁₀F₂₁SO₃K (10 parts) in acetone (190 parts), a magnetic tape was produced.

COMPARATIVE EXAMPLE 5

In the same manner as in Example 12 but using 8 parts of squalane, a magnetic tape was produced.

COMPARATIVE EXAMPLE 6

In the same manner as in Example 13 but using, as a lubricant solution, a solution of liquid paraffin (14 parts) in methyl ethyl ketone (186 parts), a magnetic tape was produced.

The magnetic recording tapes produced in Examples and Comparative Examples were examined for a coefficient of friction of the magnetic layer, durability and jitter as follows:

COEFFICIENT OF FRICTION

Around a peripheral surface of a steel made cylindrical pin of 4 mm in diameter having surface roughness of 0.2S, a magnetic recording tape is wound at an angle of 150° with facing the magnetic layer surface with the cylinder surface. Then, one end of the tape is pulled at a rate of 1.4 cm/sec. with applying a load of 21 g to the other end of the tape. After the tape is pulled one hundred times, a coefficient of friction of the surface of the magnetic layer is measured.

JITTER

A magnetic recording tape is set in a standard video tape recorder and run at a running speed of 1.4 cm/sec. with applying tension of 6 g to record and reproduce color bar signals over a tape length of 5 m, during which a jitter value is recorded with a jitter meter.

DURABILITY

A magnetic recording tape is reproduced at 25° C., 60% RH with a head load of 5 g at a running speed of 0.048 m/sec. The number of runs after which output is decreased by 3 dB from the initial output is recorded.

The results are shown in following Table.

TABLE

| Example No | Coefficient of friction | Durability (Runs) | Jitter ($\mu$s) One run | Jitter ($\mu$s) 100 runs |
|---|---|---|---|---|
| Example 1 | 0.26 | 1,340 | 1.17 | 1.33 |
| Example 2 | 0.24 | 1,030 | 1.15 | 1.46 |
| Example 3 | 0.29 | 1,225 | 1.31 | 1.85 |
| Example 4 | 0.28 | 1,178 | 1.28 | 1.67 |
| Example 5 | 0.30 | 1,130 | 1.27 | 1.79 |
| Example 6 | 0.27 | 1,180 | 1.23 | 1.35 |
| Example 7 | 0.32 | 975 | 1.41 | 2.30 |
| Example 8 | 0.33 | 870 | 1.51 | 2.53 |
| Example 9 | 0.28 | 1,310 | 1.34 | 1.52 |
| Example 10 | 0.26 | 1,190 | 1.29 | 1.48 |
| Example 11 | 0.25 | 1,030 | 1.21 | 1.67 |
| Com. Ex. 1 | 0.27 | 625 | 1.37 | 3.74 |
| Com. Ex. 2 | 0.29 | 478 | 1.45 | 5.37 |
| Com. Ex. 3 | 0.26 | 537 | 1.86 | 5.93 |
| Com. Ex. 4 | 0.39 | 387 | 2.37 | 7.23 |
| Example 12 | 0.27 | 1,130 | 1.19 | 1.51 |
| Com. Ex. 5 | 0.31 | 613 | 1.52 | 5.73 |
| Example 13 | 0.29 | 983 | 1.47 | 2.74 |
| Com. Ex. 6 | 0.37 | 469 | 2.14 | 6.39 |

Then, a relationship between the running speed of the magnetic tape and the coefficient of friction of the magnetic layer was examined. The results are shown in FIGURE in which Line A stands for the magnetic tape of Example 1 which represented the magnetic tapes of Examples 2-13 according to the present invention, and Line B stands for the magnetic tape of Comparative Example 1 which represented the comparative magnetic tapes. The results for the magnetic tapes of Examples 2-13 were substantially the same as that of Example 1, and the results for the magnetic tapes of Comparative Examples 2-6 were substantially the same as that of Comparative Example 1.

As is understood from the above results, the magnetic tapes according to the present invention have a small coefficient of friction which does not increase as the running speed increases. Further, they have good durability and jitter does not deteriorate after a long running time.

The invention being thus described, it will be obvious that the same may be varied in many ways. Such variations are not to be regarded as a departure from the spirit and scope of the present invention, and all such modifications as would be obvious to one skilled in the art are intended to be included within the scope of the following claims.

What is claimed is:

1. A magnetic recording medium comprising a substrate, a magnetic layer formed on at least one surface of said substrate and a lubricant layer coated on said at least one magnetic layer comprising a liquid lubricant phase and a solid lubricant phase substantially incompatible with each other wherein said liquid lubricant phase constitutes a continuous phase having an affinity for said magnetic layer and said solid lubricant phase constitutes a discontinuous phase dispersed in said liquid lubricant phase such that said solid lubricant phase is formed at the surface of said liquid lubricant phase such that said solid lubricant forms projections at the surface of the lubricant layer.

2. The magnetic recording medium according to claim 1, wherein the lubricant layer comprises 5 to 99.9% by weight of the liquid lubricant and 95 to 0.1% by weight of the solid lubricant.

3. The magnetic recording medium according to claim 1, wherein said liquid lubricant is selected from at least one member of the group consisting of a fluorine-containing liquid compound, a organic silicon compound and a fatty acid ester, and said solid lubricant is selected from at least one member of the group consisting of a higher fatty acid, a higher fatty acid ester and a fluorine-containing solid compound.

4. The magnetic recording medium according to claim 3, wherein the fluorine-containing liquid compound is a compound of the formula:

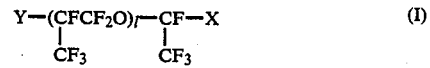

$$Y-(CFCF_2O)_l-CF-X \quad\quad (I)$$
$$\phantom{Y-(CFCF_2O)_l-}|\phantom{-CF-}|$$
$$\phantom{Y-(CFCF_2O)_l-}CF_3\phantom{-}CF_3$$

or

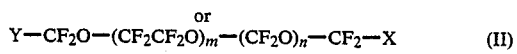

$$Y-CF_2O-(CF_2CF_2O)_m-(CF_2O)_n-CF_2-X \quad\quad (II)$$

wherein X and Y are the same or different and each a fluorine atom, a hydrophilic group or a monovalent group having a terminal carbon-carbon double bond, l is an integer of 10 to 100, m is an integer of 5 to 100 and n is an integer of 10 to 200.

5. The magnetic recording medium according to claim 4, wherein the hydrophilic groups X and/or Y are a hydroxyl group, a carboxyl group, a phosphoric acid group [—OP(=O)(OH)$_2$], a sulfonic acid group [—OS(=O)$_2$OH], an isocyanate group, metal salts of these groups or an organic group containing one of these groups and their salt forms.

6. The magnetic recording medium according to claim 4, wherein the organic groups X and/or Y having the terminal carbon-carbon double bond are a (meth)acryloyloxy group of the formula:

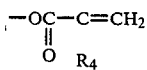
wherein $R_4$ is a hydrogen atom or a methyl group, or an alkylene group having said (meth)acryloyloxy group.
7. The magnetic recording medium according to claim 3, wherein the solid lubricant is a fluorine-containing solid compound having an alkylene group, an alkyleneoxide group or a polyalkyleneoxide group in the molecule.
* * * * *